March 14, 1950     T. C. AVERY ET AL     2,500,507
APPARATUS FOR TEACHING OF TYPEWRITING
Filed April 7, 1947     2 Sheets-Sheet 1
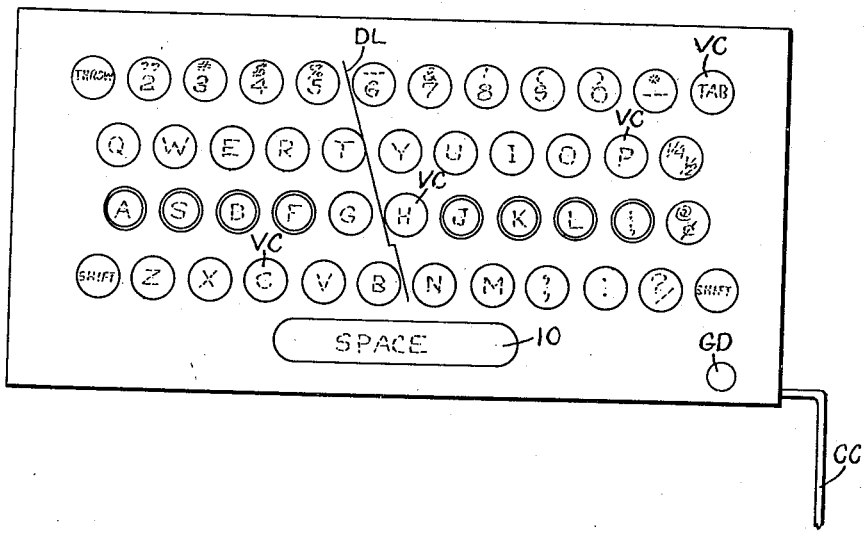
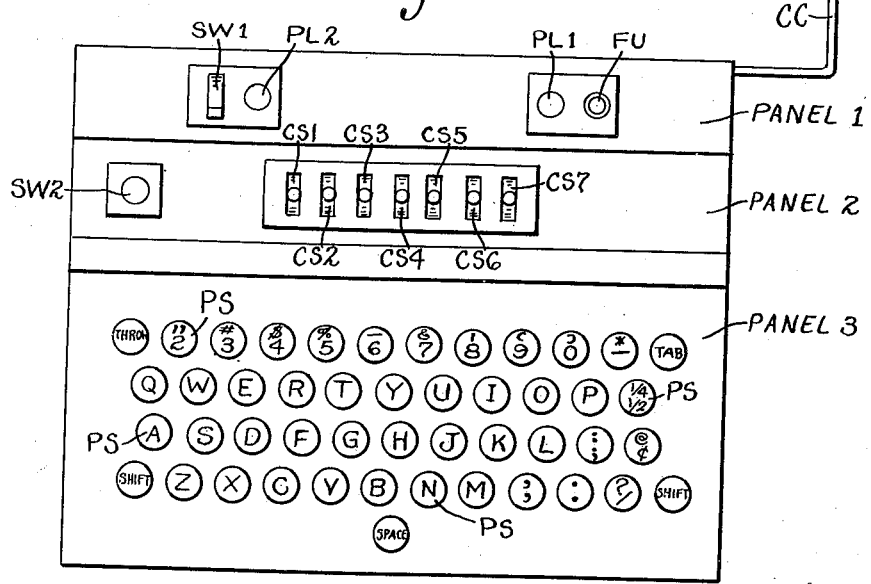

March 14, 1950     T. C. AVERY ET AL     2,500,507
APPARATUS FOR TEACHING OF TYPEWRITING Filed April 7, 1947     2 Sheets-Sheet 2

Patented Mar. 14, 1950

2,500,507

UNITED STATES PATENT OFFICE 2,500,507

APPARATUS FOR TEACHING OF TYPEWRITING

Thaddeus C. Avery and Mildred Gilchrist Avery, Anaconda, Mont.

Application April 7, 1947, Serial No. 739,842

4 Claims. (Cl. 35—5)

This invention relates to the teaching of touch-typewriting and a device for facilitating such teaching.

As is well-known when the touch system of typewriting is taught, the keyboard is divided into right and left portions, each one comprising substantially half of the keyboard, and the keys on one of these portions are operated by the fingers of the left hand, while the keys on the other of these portions are operated by the fingers of the right hand. There are eleven diagonal rows of keys on the standard typewriter keyboard, these rows extending generally in a front to rear direction, and five of them are operated by the left hand, while the other six rows are operated by the right hand. As only four fingers of each hand are used, the forefinger of the left hand operates two rows of keys. For example, the forefinger of the left hand operates the F-key and also operates the G-key, and the other keys in the same rows as the G-key. The keys of this latter row are called extension keys, as the forefinger of the left hand is extended to also operate these keys. The same is true of the two rows of keys operated by the forefinger of the right hand, and the two rows of keys operated by the little finger of the right hand.

We contemplate by the present invention the provision of a device having a keyboard similar to that of a typewriter and a so-called masterboard, which is provided with letters and other characters which may be illuminated by electrically lighted lamps situated behind these characters, so that when the user of the device strikes a key, which is really a switch, upon the keyboard, the corresponding lamp upon the masterboard will be lighted, and will indicate to the operator visually that he has struck the proper key.

We provide a control box which consists of a switch board having a plurality of push switches arranged similarly to the standard typewriter keyboard, and also some group switches which may be thrown to illuminate certain groups of characters on the masterboard. For example, there are certain keys known as "home" keys and switches are arranged to illuminate these "home" keys in groups of four. Likewise, each row of keys from front to back, which constitute the keys operated by a finger of one hand, may also be illuminated as a group by these switches, so that an instructor may illustrate to an entire class, for example, the principles of the touch system of typewriting.

One object of the invention is to provide a method of teaching typewriting which will enable the student to get a clearer conception of the typewriter keyboard through visual illustration, and a device for carrying out this method.

A further object of the invention is to provide a device which will furnish a stimulus to the learning of touch typewriting which will enable the student to learn typing with greater accuracy as the student will be enabled to determine the correct distance and direction of stroke without giving conscious attention to touch, thus, establishing habits that will contribute to both accuracy and speed of operation.

A still further object of the invention is to provide a device which will facilitate the teaching of touch typewriting in schools where students are taught in groups rather than individually.

To these and other ends the invention consists in the novel features and combinations of parts to be hereinafter described and claimed.

In the accompanying drawings:

Fig. 1 is a diagrammatic representation of the masterboard provided with characters which may be electrically illuminated;

Fig. 2 is a diagrammatic representation of the control box, which carries the various switches for illuminating the lamps mounted on the masterboard;

Figure 3:
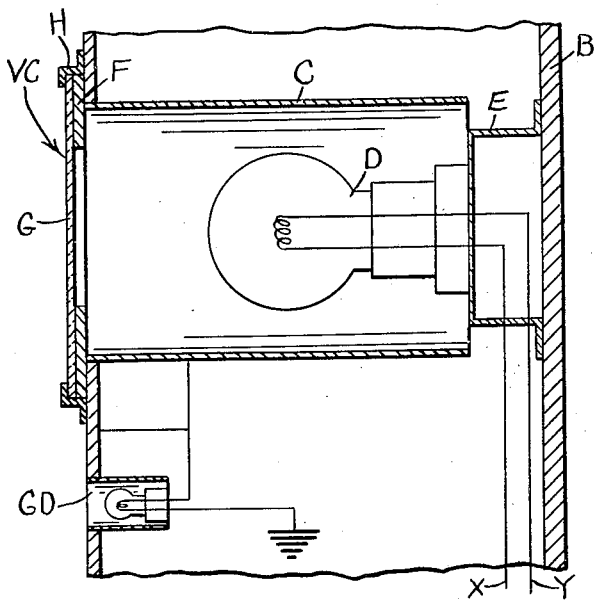
Fig. 3 is a sectional view of one of the units on the masterboard shown in Fig. 1.

In Fig. 1 of the drawings, we have shown a representation of a masterboard which is provided with a plurality of stations or characters which may be illuminated as hereinafter explained. A detail of one of such stations is shown in Fig. 3, and the board embodies a support B upon which are carried a plurality of lamps D, the lamps being secured in place by the brackets E. Each of these lamps is enclosed in a cylindrical reflector C of proper length which extends between the support B and a front panel A, the cylindrical reflector being mounted in an opening in the panel A.

Secured to the panel A in front of this opening is a plate F which may be formed of sheet metal or plastic material, which plate carries a letter or other character stamped out from its material, so that when the lamp D is illuminated, this character will be plainly visible to anyone in front of the panel. These plates are secured to the panel A by the clips H and, secured over the plates F, are translucent lenses G of glass or other material, these lenses being treated on one side so that the illuminated character cut from the plate F will be displayed clearly and distinctly.

Each of these characters is designated on Fig. 1 as VC, visual character, and, as will be clear, the visual characters on the masterboard correspond to those on a keyboard of a typewriter. The line DL on Fig. 1 indicates the dividing line between the keys to the left which are operated by the fingers of the left hand, and those to the right which are operated by the fingers of the right hand. A ground detector is provided as indicated at GD although this may be arranged at any convenient place. Likewise, a spacer bar 10 is indicated below the characters VC.

The control box as shown in Fig. 2 of the drawings is illustrated as having three parts or panels. On panel 1 there is a pilot light PL1 which is illuminated when the device is plugged into an electric circuit, which will be the usual source of current. A fuse FU is situated in this line as a safety measure. Also on this part of the control box is a switch SW1 which must be turned on before the device may operate even when it has been plugged into the source of current. That is, it will be found convenient to have a switch to turn the device on and off instead of removing the plug from the socket. A second pilot light PL2 will be illuminated when this switch is turned on to indicate that the device is ready for operation.

Figure 4:
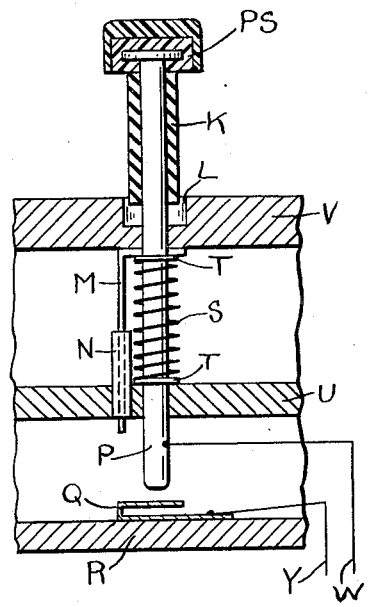
Fig. 4 is an enlarged fragmentary sectional view of one of the box switches shown in Fig. 2.

In panel No. 3, there are a number of push switches PS which in number and position correspond respectively to the illuminated visual characters VC shown in Fig. 1, and which, of course, also correspond in number and position to the keys of the usual typewriter keyboard. As shown in Fig. 4, each one of these push switches has a cap at the top which will preferably be of insulating material and which will have the same markings as the corresponding key of the standard typewriter keyboard. As shown in Fig. 4, this part of the control box comprises three members or plates substantially parallel to each other, a top member V, an intermediate member U, and a base R. Each of the push switches has a metal stem P slidably mounted in the members U and V, and the member V is recessed at L to admit therein the insulating sleeve K surrounding the upper portion of the stem P of conducting material. A guide M is secured to the stem P and this guide is slidably mounted in a sleeve N, so as to prevent the stem from turning. Below the guide M, a compression spring S acts between this guide and the member U so as to maintain the key in its upper position.

It will be seen that when a push switch is depressed by a finger of the operator, the stem P will be moved downwardly against the spring S, which spring reacts against washers T at each end. When the stem P is depressed it engages a contact Q mounted upon the base R. A wire W is connected to the stem P, which wire leads to the switch SW1 and through this switch is connected with the source of current. A wire Y is connected to the contact Q and, as shown in Fig. 3, is connected to one of the terminals of one of the lamps D. It will be apparent that when the push switch is depressed, current will flow from the source of current to one terminal of the corresponding lamp and will return to the source through the wire X (Fig. 3), which wire is connected to the other terminal of the lamp and also leads to the switch SW1, and to the source of current. As will be understood, this wire X is the common wire which will lead to all of the lamps while there will be a wire Y connecting each of the push switches with a corresponding lamp in the masterboard shown in Fig. 1.

It will be seen from the above that each of the lamps D may be illuminated by pressing downwardly on the appropriate button or push switch PS, but it will be found desirable to be able to illuminate certain of the groups or lamps.

For example, we have found it convenient to illuminate each of the groups of lamps corresponding to each diagonal row of four keys, and also to illuminate in groups the keys which are ordinarily termed the "home" keys, which are shown in double lines in Fig. 1. As there are eleven rows of four keys each, and two sets of "home" keys, this will require thirteen switches or at least thirteen switch positions. We, therefore, have provided on panel No. 2 combination switches CS1, CS2, CS3, CS4, CS5, CS6, and CS7. Of these switches, CS1 has one operative position only, but each of the remaining switches have two operative positions, an up position and a down position, so that the thirteen different groups of lamps or keys may be illuminated by the use of these switches. It will be understood that when one of these switches is thrown upwardly, it will close the circuit through wires leading to four of the lamps, which constitute one of the above-described groups, and when that switch is thrown downwardly, it will close the circuits through another group of four lamps. A switch SW2 is mounted on this panel in order to connect and disconnect these switches CS1, etc., with the source of current, so as to render these switches operative or inoperative as desired.

Figure 5:
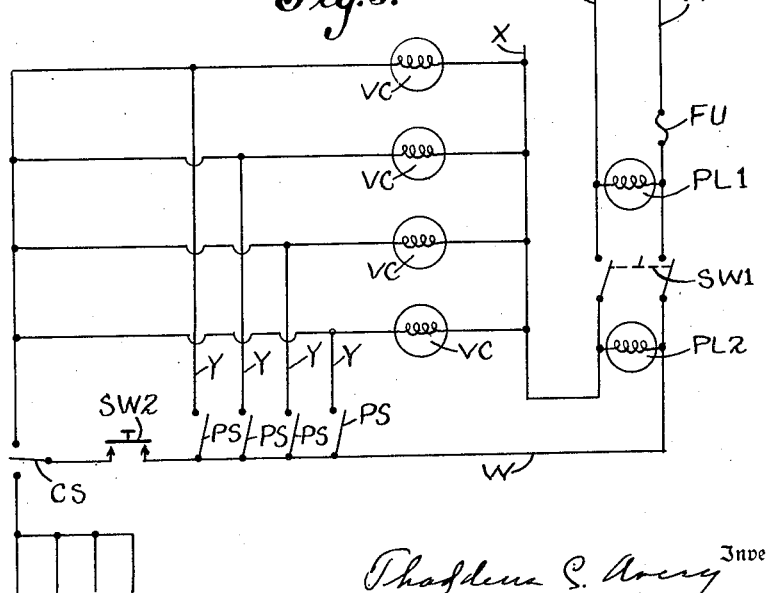
Fig. 5 is a diagrammatic view of the wiring connections between the control box of Fig. 2 and the masterboard of Fig. 1 showing the wiring to one group of keys.

In Fig. 5 of the drawings, we have shown a wiring diagram through four of the lamps which constitute a group, and this diagram also shows the action of the group switches CS1, etc., which will illuminate a group of lamps at one time.

As has already been described, the wire W leads from the source of current to the switches PS, and as shown in Fig. 5, of the drawings, each of these switches is operated independently, or one at a time to light a particular one of the four lamps indicated back of the visual characters VC. The switch SW2 connects this line W with the switch CS, and this latter switch, as will be apparent, when thrown upwardly, will close a circuit through the four wires leading to the four lamps, lighting the visual characters VC, so that these characters will be illuminated simultaneously. When this switch CS is thrown downwardly, it will illuminate another group of four lamps (not shown). It is believed that the electrical connections will be clear from this figure from which it will be observed that the wire X will be a common wire leading to one terminal of each of the lamps from the source of current, while the switches PS or CS will connect the other terminal of the lamps with the source of current.

Preferably the lights on the masterboard will be of different colors and for this purpose light bulbs of different colors are employed for the lamps D. For example, the lights of the row of four characters at the left of the line DL will be red, as will the next row of characters, as both are operated by the same finger. The third row will be green, the fourth red, and the fifth, and last, green. Similarly the first two rows of characters at the right of the line DL will be green, the third row red, the fourth green, and the fifth and sixth red. Thus the lamps of each of these groups will be of the same color, but a different color from those operated by the next finger.

From the above, it will be seen that we have provided a device having a control box comprising a plurality of push switches and simulated typewriter keys, each of which switches will illuminate a corresponding character upon the masterboard from which it may be readily seen by the group of students. Moreover, when it is desired to illuminate any one of a plurality of groups of these characters, this may also be done by the switches CS1, CS2, etc. By arranging for these switches to have two operative positions, we need only provide seven instead of thirteen, which would be necessary if each switch had only one operative position. It will also be understood that these switches are in an "off" position when in their intermediate positions.

While we have shown and described a preferred embodiment of our invention, it will be understood that it is not to be limited to all of the details shown, but is capable of modification and variation within the spirit of the invention and within the scope of the claims.

What we claim is:

1. In a device of the class described, a masterboard having thereon characters representing the keyboard of a typewriter, said characters being normally invisible, electric means to illuminate each of said characters individually, electrical circuits leading from a source of current to each of said means, switch means to energize each of said circuits independently, and an additional switch to energize simultaneously a plurality of said circuits when said last-named circuit is closed.

2. A device of the character described comprising a masterboard having characters thereon corresponding to those of a typewriter keyboard, illuminating means for each of said characters, an electric circuit leading to said means from a source of current, a switch in each of said circuits to energize a corresponding illuminating means individually, means for connecting said circuits together in groups, and a group switch means to simultaneously energize the illuminating means of one group independently of those of another group.

3. A device of the character described comprising a masterboard having characters thereon corresponding to those of a typewriter keyboard, illuminating means for each of said characters, an electric circuit leading to said means from a source of current, a switch in each of said circuits to energize a corresponding illuminating means individually, means for connecting said circuits together in groups, a plurality of group switches, and means whereby the operation of one of said switches energizes the illuminating means of one of said groups, each of said group switches having two operative positions and energize the illuminating means of one group in one position and the illuminating means of another group in another position.

4. A device of the character described comprising a masterboard having characters thereon corresponding to those of a typewriter keyboard, illuminating means for each of said characters, an electric circuit leading to said means from a source of current, a switch in each of said circuits to energize a corresponding illuminating means individually, means for connecting said circuits together in groups, a plurality of group switches, and means whereby the operation of one of said switches energizes the illuminating means of one of said groups, the illuminating means of the characters of one group being of a color different from that of an adjacent group.

THADDEUS C. AVERY.
MILDRED GILCHRIST AVERY.

REFERENCES CITED

The following references are of record in the file of this patent:

UNITED STATES PATENTS

| Number | Name | Date |
| --- | --- | --- |
| 1,799,709 | Simmons | Apr. 7, 1931 |
| 1,984,599 | Safar | Dec. 18, 1934 |
| 2,132,474 | En Holm | Oct. 11, 1938 |
| 2,154,478 | Smith | Apr. 18, 1939 |